(12) United States Patent
Vidal et al.

(10) Patent No.: US 9,367,302 B2
(45) Date of Patent: Jun. 14, 2016

(54) GENERATING CLIENT QUALIFICATION TO EXECUTE PACKAGE UPDATE MANAGER

(75) Inventors: Seth Kelby Vidal, Raleigh, NC (US); James Antill, Bristol, CT (US)

(73) Assignee: Red Hat, Inc., Raleigh, NC (US)

( * ) Notice: Subject to any disclaimer, the term of this patent is extended or adjusted under 35 U.S.C. 154(b) by 696 days.

(21) Appl. No.: 12/788,458

(22) Filed: May 27, 2010

(65) Prior Publication Data

US 2011/0296395 A1    Dec. 1, 2011

(51) Int. Cl.
*G06F 9/44* (2006.01)
*G06F 9/445* (2006.01)
*G06F 11/34* (2006.01)

(52) U.S. Cl.
CPC .............. *G06F 8/68* (2013.01); *G06F 9/44589* (2013.01); *G06F 11/3466* (2013.01)

(58) Field of Classification Search
None
See application file for complete search history.

(56) References Cited

U.S. PATENT DOCUMENTS

| | | | |
|---|---|---|---|
| 6,438,749 B1 | 8/2002 | Chamberlain | |
| 6,789,215 B1 * | 9/2004 | Rupp et al. | 714/38.14 |
| 7,047,527 B1 * | 5/2006 | Lin et al. | 717/170 |
| 7,240,336 B1 | 7/2007 | Baker | |
| 7,376,945 B1 * | 5/2008 | Kakumani et al. | 717/171 |
| 7,512,939 B2 | 3/2009 | Brookner | |
| 7,620,948 B1 * | 11/2009 | Rowe et al. | 717/171 |
| 7,624,393 B2 * | 11/2009 | Egan et al. | 717/173 |
| 7,657,885 B2 | 2/2010 | Anderson | |
| 7,735,079 B1 * | 6/2010 | Davis et al. | 717/174 |
| 7,739,554 B2 * | 6/2010 | Van Riel et al. | 714/48 |
| 7,836,341 B1 | 11/2010 | Krishnan | |
| 8,185,889 B2 * | 5/2012 | Kinder et al. | 717/174 |
| 2002/0170052 A1 * | 11/2002 | Radatti | 717/171 |
| 2003/0051235 A1 | 3/2003 | Simpson | |
| 2003/0229890 A1 | 12/2003 | Lau et al. | |
| 2005/0021535 A1 * | 1/2005 | Skow | 707/100 |
| 2005/0210459 A1 | 9/2005 | Henderson et al. | |
| 2005/0223374 A1 * | 10/2005 | Wishart et al. | 717/173 |
| 2006/0190773 A1 | 8/2006 | Rao et al. | |
| 2006/0200814 A1 * | 9/2006 | Kontinen et al. | 717/168 |
| 2006/0230398 A1 | 10/2006 | Yokota | |
| 2007/0038991 A1 | 2/2007 | Schuft et al. | |
| 2007/0150886 A1 * | 6/2007 | Shapiro | 717/174 |
| 2007/0157192 A1 | 7/2007 | Hoefler et al. | |
| 2007/0169075 A1 | 7/2007 | Lill et al. | |
| 2008/0127171 A1 * | 5/2008 | Tarassov | 717/174 |
| 2008/0134165 A1 | 6/2008 | Anderson et al. | |

(Continued)

OTHER PUBLICATIONS

Seth Kelby Vidal, "Systems and Methods for Initiating Software Repairs in Conjuction With Software Package Updates", U.S. Appl. No. 12/714,200, filed Feb. 26, 2010.

(Continued)

*Primary Examiner* — Isaac T Tecklu
(74) *Attorney, Agent, or Firm* — Lowenstein Sandler LLP (57) ABSTRACT

A compatibility tool can certify compliance between software packages managers, used by or known to a user, and software packages to be updated or installed on a computing system. Additionally, the compatibility tool can identify a software package manager that is compatible with the software packages to be updated or installed, if the user does not have or know of a compatible software package manager. To certify software package managers or identify compatible software package managers, the compatibility tool can maintain a database of software package managers associated with software packages that are compatible with the software package managers.

18 Claims, 8 Drawing Sheets

(56) References Cited

U.S. PATENT DOCUMENTS

| | | | |
|---|---|---|---|
| 2008/0141170 A1* | 6/2008 | Kodosky et al. | 715/810 |
| 2008/0141240 A1 | 6/2008 | Uthe | |
| 2008/0201705 A1 | 8/2008 | Wookey | |
| 2008/0320465 A1* | 12/2008 | Kinder et al. | 717/170 |
| 2009/0013319 A1 | 1/2009 | Williams et al. | |
| 2009/0037897 A1 | 2/2009 | Dull et al. | |
| 2009/0300595 A1 | 12/2009 | Moran et al. | |
| 2010/0023933 A1 | 1/2010 | Bryant et al. | |
| 2010/0058308 A1 | 3/2010 | Demshur et al. | |
| 2010/0058314 A1 | 3/2010 | Wang | |
| 2010/0083243 A1 | 4/2010 | Mincarelli et al. | |
| 2011/0107299 A1* | 5/2011 | Dehaan | 717/121 |

OTHER PUBLICATIONS

Seth Kelby Vidal, "Systems and Methods for Diagnostic Notification Via Package Update Manager", U.S. Appl. No. 12/714,258, filed Feb. 26, 2010.

Seth Kelby Vidal, "Systems and Methods for Managing Software Package Updates Using Communication Pipes", U.S. Appl. No. 12/714,208, filed Feb. 26, 2010.

Seth Kelby Vidal, "Systems and Methods for Generating and Storing Translation Information as Package Metadata", U.S. Appl. No. 12/714,171, filed Feb. 26, 2010.

Seth Kelby Vidal, "Systems and Methods for Generating Predictive Diagnostics Via Package Update Manager", U.S. Appl. No. 12/714,222, filed Feb. 26, 2010.

James Antill, "Systems and Methods for Defining and Enforcing Access Policy for Package Update Processes", U.S. Appl. No. 12/873,850, filed Sep. 1, 2010.

Seth Kelby Vidal, "Systems and Methods for Generating Cached Representations of Encoded Package Profile", U.S. Appl. No. 12/788,139, filed May 26, 2010.

Seth Kelby Vidal, "Systems and Methods for Generating Cached Representations of Host Package Inventories in Remote Package Repositories", U.S. Appl. No. 12/790,699, filed May 28, 2010.

Seth Kelby Vidal, "Systems and Methods for Generating Package Profiles in Software Package Repositories Using Selective Subsets of Packages", U.S. Appl. No. 12/873,557, filed Sep. 1, 2010.

Seth Kelby Vidal, "Systems and Methods for Generating an Encoded Package Profile Based on Executing Host Processes", U.S. Appl. No. 12/787,104, filed May 26, 2010.

Seth Kelby Vidal, "Systems and Methods for Restoring Machine State History Related to Detected Faults in Package Update Process", U.S. Appl. No. 12/788,036, filed May 26, 2010.

Seth Kelby Vidal, "Systems and Methods for Managing Versions of Software Packages", U.S. Appl. No. 13/037,363, filed Mar. 1, 2011.

Seth Kelby Vidal, "Systems and Methods for Determining When to Update a Package Manager Software", U.S. Appl. No. 12/790,752, filed May 28, 2010.

Seth Kelby Vidal, "Systems and Methods for Generating Exportable Encoded Identifications of Networked Machines Based on Installed Package Profiles", U.S. Appl. No. 12/768,416, filed Apr. 27, 2010.

Seth Kelby Vidal, "Systems and Methods for Tracking Computing Systems Utilizing Software Repositories", U.S. Appl. No. 12/955,671, filed Nov. 29, 2010.

Seth Kelby Vidal, "Systems and Methods for Automatic Upgrade and Downgrade in Package Update Operations", U.S. Appl. No. 12/892,227, filed Sep. 28, 2010.

Seth Kelby Vidal, "Systems and Methods for Detection of Malicious Software Packages", U.S. Appl. No. 12/898,876, filed Oct. 6, 2010.

Seth Kelby Vidal, "Systems and Methods for Space Efficient Software Package Management", U.S. Appl. No. 12/610,006, filed Oct. 30, 2009.

* cited by examiner

COMPATIBILITY DATABASE 128

| PACKAGE MANAGER | SOFTWARE PACKAGES | SOFTWARE REPOSITORIES | LOCATION TO DOWNLOAD |
|---|---|---|---|
| YUM SOFTWARE PACKAGE MANAGER V.1, V.2, V.3 | RHEL V.1, RMP FEDORA V.1, RPM | SOFTWARE REPOSITORY "A" | WWW.YUM.COM |
| DEBIAN SOFTWARE PACKAGE MANAGER V.1, V.2 | OPEN OFFICE V.1, .DEB | SOFTWARE REPOSITORY "B" SOFTWARE REPOSITORY "C" | WWW.DEBIAN.COM |
| ..... | | | |

FIG. 2A

| SOFTWARE PACKAGE MANAGER 120
YUM PACKAGE MANAGER
VERSION 1 |
|---|
| FEDORA V.1 IS COMPATIBLE<br><br>- SOFTWARE REPOSITORY "A" IS A COMPATIBLE REPOSITORY |
| OPEN OFFICE V.1 IS NOT COMPATIBLE<br><br>-DEBIAN SOFTWARE PACKAGE MANAGER V.1 IS COMPATIBLE<br>- A COPY OF DEBIAN PACKAGE MANAGER V.1 CAN BE DOWNLOADED<br>   FROM WWW.DEBIAN.COM<br>- SOFTWARE REPOSITORY "B" AND SOFTWARE REPOSITORY "C" ARE COMPATIBLE |

GENERATING CLIENT QUALIFICATION TO EXECUTE PACKAGE UPDATE MANAGER

FIELD

This invention relates generally to computer software installation for computing systems.

DESCRIPTION OF THE RELATED ART

Today, a person using a computing system has a variety of avenues for obtaining software and installing the software on the computing system, such as purchasing physical media and downloading the software over a network. When downloading the software over a network, the person can acquire and install the software using a software package delivery system. The software package delivery system typically consists of a software repository which stores and maintains various software packages. The software packages typically consist of software stored in an archive format that includes data for installing the software.

To obtain the software packages, the person can utilize a software package manager. The software package manager executes locally on a computing system and is responsible for retrieving the software packages and installing the software package on the computing system. Typically, the software package manager is specific to the type and format of the software packages or the software repository. In other words, a software package manager that is compatible with one software package may not be compatible with another software package. This can pose a problem to a user that desires to update different software packages or install new software packages from different software repositories.

For example, a user can have a software package manager that works with software repository A to install software package A, but desires to acquire software package B from software repository B. In this example, the user has no way of determining whether the software package manager will function properly with software repository B to install the software package B, other than, blindly attempting to acquire and install the software package B. This blind attempt, however, could possibly damage the user's computing system or software already installed on the computing system. This problem is further complicated by the fact that a multitude of different software repositories and software package managers currently exist.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific embodiments. Electrical, mechanical, logical and structural changes may be made to the embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for certifying compatibility of known software package managers with software packages to be updated or installed on computing systems. Additionally, embodiments of the present teachings relate to systems and methods for determining software package managers that are compatible with software packages to be updated or installed on computing systems.

According to embodiments, a compatibility tool can be configured to certify compliance between software packages managers, used by or known to a user, and software packages to be updated or installed on a computing system. The user can request that the compatibility tool certify that a particular software package manager is compatible with software packages that are being updated or new software packages that the user desires to install on a computing system. The user can specify the software package manager and the software packages to certify. Likewise, the user can request that the compatibility tool certify a software package manager installed on the computing system with all software packages installed on the computing system. Once the request is received, the compatibility tool can be configured to determine whether the particular software package manager is compatible with the software packages and configured to notify the user of the determination.

According to embodiments, the compatibility tool can be configured to identify a software package manager that is compatible with the software packages to be updated or installed, if the user does not have or know of a compatible software package manager. The user can request that the compatibility tool identify the software package manager compatible with the software packages being updated or installed. The user can specify the software packages being updated or installed, or the user can specify that a software package manager be identified for all software packages installed on a computing system. Once the request is received, the compatibility tool can be configured to determine the software package managers that are compatible with the software packages to be updated or installed and configured to notify the user of the determined software package managers.

By utilizing the compatibility tool, a user can verify that a software package manager will work with software packages being updated or installed. Likewise, if the user doesn't know which software package manager to use, the user can easily identify a software package manager that is compatible with a software package. As such, the user can identify and acquire the correct software package manager without possibly damaging their computing system.

Figure 1A:
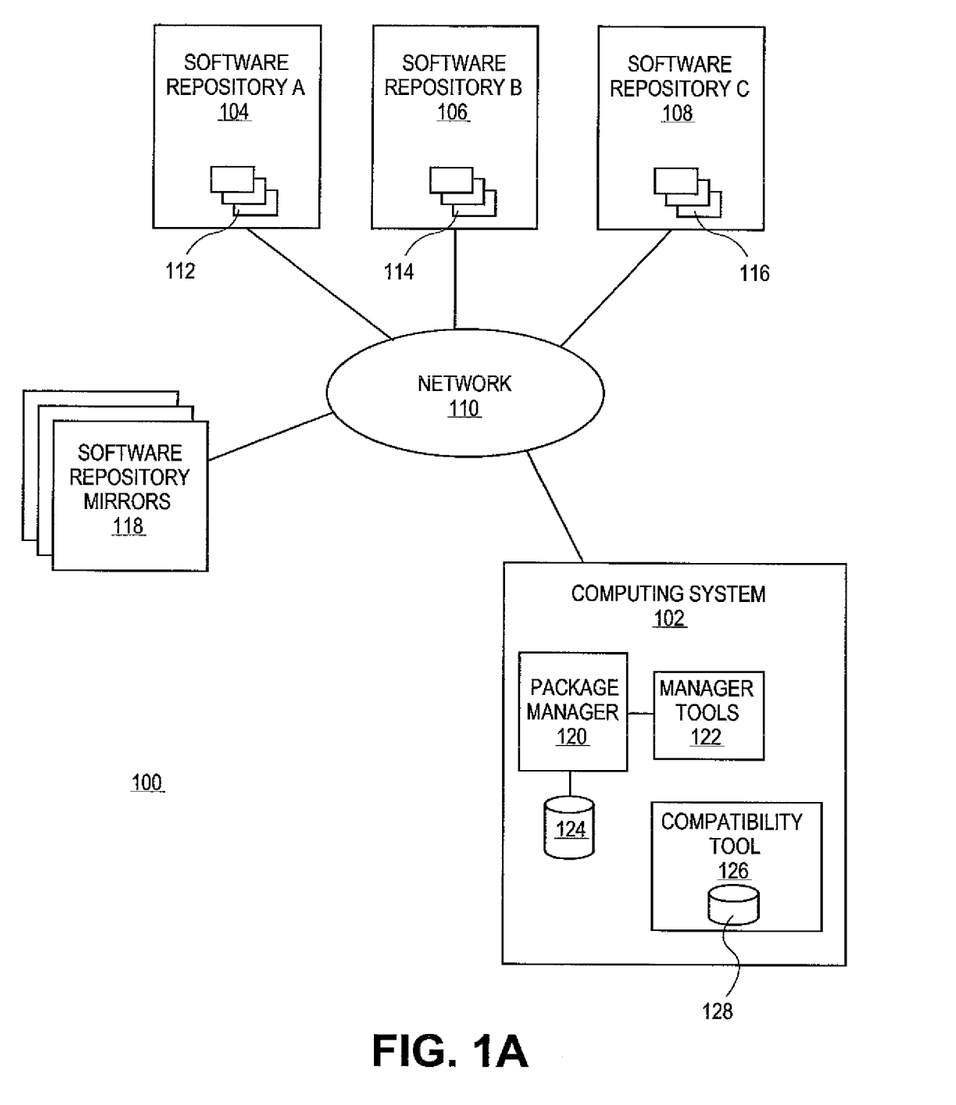
FIGS. 1A and 1B illustrate examples of a software package delivery system including a compatibility tool, in which various embodiments of the present teachings can be practiced.

FIG. 1A illustrates a software package delivery system 100, according to various embodiments of the present teachings. While FIG. 1A illustrates various components that can be included in the software package delivery system 100, one skilled in the art will realize that additional components can be added or existing components can be removed.

As illustrated in FIG. 1A, the software package delivery system 100 can be designed to allow a computing system 102 to communicate with one or more software repositories, such as a software repository "A" 104, a software repository "B" 106, and a software repository "C" 108, via one or more networks 110. The computing system 102 can communicate with the software repository "A" 104, the software repository "B" 106, and the software repository "C" 108 in order to obtain and install software packages 112, software packages 114, and software packages 116, respectively. The software repository "A" 104, the software repository "B" 106, and the software repository "C" 108 can be implemented as any type of open-source or proprietary software repository, which can store the software packages 112, the software packages 114, and the software packages 116, respectively, and provide the software packages to the computing system 102. For example, the software repository "A" 104, the software repository "B" 106, and the software repository "C" 108 can be implemented as a Yum repository, Debian™ repository, or any other type of conventional software repository.

As described herein, the software packages 112, the software packages 114, and the software packages 116 can include one or more software programs or software program updates that are packaged together in a format that allows a software package manger or software package installer to install the software programs or updates, contained in the software packages 112, the software packages 114, and the software packages 116. The software programs included in the software packages 112, the software packages 114, and the software packages 116 can be any type of software programs such as operating systems (OS), application programs, and the like or updates to these software programs. The software packages 112, the software packages 114, and the software packages 116 can also include metadata that describes the software packages, such as the name of the software package, the software programs included in the package, epoch, version, release and arch of the software packages, description of the purpose of the software packages, etc. The software packages 112, the software packages 114, and the software packages 116 can also include metadata that aids in the installation of the software programs contained in the software packages, such as checksums, format of the checksums, and a list of dependencies of the software packages. The checksums verify the integrity of the files of the software packages 112, the software packages 114, and the software packages 116 e.g. that the files of the software packages are complete and correct. The list of dependencies can describe the relationship of the software programs or software program updates contained in the software packages 112, the software packages 114, and the software packages 116 and any other software programs, file, software libraries, etc. required by the software packages.

The software repository "A" 104, the software repository "B" 106, and the software repository "C" 108 can store the software packages 112, the software packages 114, and the software packages 116 in any type of open-source or proprietary format depending on the type of the software repository. For example, the software packages 112, the software packages 114, and the software packages 116 can be in conventional formats such as RPM format for a Yum repository, .deb format for a Debian™ repository, or other conventional formats.

The software package delivery system 100 can also include one or more software repository mirrors 118, coupled to the one or more networks 106. The software repository mirrors 118 can be configured to maintain copies of the software packages offered by any of the software repository "A" 104, the software repository "B" 106, and the software repository "C" 108. The software repository mirrors 118 can be configured to backup any of the software repository "A" 104, the software repository "B" 106, and the software repository "C" 108. For example, the software repository mirrors 118 can provide the software packages 112 to the computing system 102, in the event that the software repository "A" 104 is unavailable or the software repository "A" 104 is experiencing high traffic.

The software repository "A" 104, the software repository "B" 106, the software repository "C" 108, and the software repository mirrors 118 can be supported by any type of computing systems capable of storing the software packages, capable of communicating with the one or more networks 110 and capable of running a repository application for cooperating with a software package manager or software package installer in order to deliver the software packages. For example, the software repository "A" 104, the software repository "B" 106, the software repository "C" 108, and the software repository mirrors 118 can be supported by conventional computing systems or other devices such as such as servers, personal computers, laptop computers, network-enabled media devices, networked stations, etc. As such, the computing systems supporting the software repository "A" 104, the software repository "B" 106, the software repository "C" 108, and the software repository mirrors 118 can include conventional hardware such as processors, memory, computer readable storage media and devices (CD, DVD, hard drive, portable storage memory, etc.), network devices, and the like.

The one or more networks 110 can be or include the Internet, or other public or private networks. The one or more networks 110 can be or include wired, wireless, optical, and other network connections. One skilled in the art will realize that the one or more networks 110 can be any type of network, utilizing any type of communication protocol, to connect computing systems.

The computing system 102 can be any type of conventional computing system or other device such as such as servers, personal computers, laptop computers, network-enabled media devices, networked stations, etc. As such, the computing system 102 can include conventional hardware such as processors, memory, computer readable storage media and devices (CD, DVD, hard drive, portable storage memory, etc.), network devices, and the like.

In order to communicate with the software repositories, the computing system 102 can include a software package manager 120. The software package manager 120 can be configured to cooperate with one or more of the software repository "A" 104, the software repository "B" 106, the software repository "C" 108 to perform various actions associated with the software packages. For example, the software package manager 120 can be configured to retrieve one or more of the software packages 112, maintained by the software repository "A" 104 and configured to install the software packages 112 on the computing system 102. Likewise, the software package manager 120 can be configured to retrieve updates to the software packages 112, already installed on the computing system 102, and install the updates on the computing system 102.

The package manager 110 can be configured to cooperate with manager tools 122 to perform actions related to the software packages. For example, the manager tools 122 can be configured to install and update particular application programs, files, or software libraries maintained by the software repository "A" 104, the software repository "B" 106, the software repository "C" 108. As such, the manager tools 122 can be configured to provide a request to the software package manager 120 to perform the installation or update.

The software package manager 120 can be configured to allow a user of the computing system 102 to request the various actions associated with installing and updating software packages. To achieve this, the software package manager 120 can be configured to provide command line interfaces or graphical user interfaces (GUIs) that allow the user to direct the software package manager 120 to perform the actions. For example, the software package manager 120 can provide GUIs that display the software packages, such as new software packages and software package updates, available in the software repositories and that allow the user to select the action to be performed related to the software packages. Likewise, in order to perform the various actions, the software package manager 120 can be configured to communicate with the software repository "A" 104, the software repository "B" 106, the software repository "C" 108 and retrieve data from the software repositories. For example, when providing the GUIs to a user of the computing system 102, the software package manager 120 can retrieve a list of the software packages 112 from the software repository "A" 104. Likewise, for example, when installing or updating a particular software package, the software package manager 120 can retrieve the particular software package updates and any other data associated with the particular software package.

When performing the various actions, the software package manager 120 can be configured to utilize the metadata associated with the software packages in order to perform the actions. For example, when installing a particular software package or updating a particular software package, the software package manager 120 can access the metadata associated with the particular software package in order to properly install or update the software package on the computing system 102. For instance, the software package manager 120 can utilize the checksums and the list of dependencies in the metadata in order to identify and verify the software programs, files, and software libraries that are affected. Additionally, when performing the various actions, the software package manager 120 can be configured to store the metadata in a database 124.

The software package manager 120 can be any application program that is capable of executing on the computing system 102 to perform the actions described above. For example, the software package manager 120 can be any type of conventional open-source or proprietary package manager such as Yum package manager, Debian™ package manager, and the like. The software package manager 120 can be stored on computer readable storage devices or media (CD, DVD, hard drive, portable storage memory, etc.) of the computing system 102 and executed by the computing system 102.

As described above, the software package delivery system 100 can include several different software repositories such as the software repository "A" 104, the software repository "B" 106, and the software repository "C" 108. Often these software repositories can be different types of software repositories and offer different software packages in different formats. Accordingly, the software repositories and the software packages may only be compatible with the corresponding software package manager. For example, the software repository "A" 104 can be a Yum repository that maintains software packages in the RPM format and is compatible with the Yum software package manager, and the software repository "B" 106, and the software repository "C" 108 can be a Debian™ repository that maintains software packages in the .deb format and is compatible with the Debian™ software package manager. Thus, for example, if the software package manager 120 is a Yum software package manager, the software package manager 120 may not be compatible with the software repository "B" 106, and the software repository "C" 108 and may not be able to update or install the software packages 114 and the software packages 116 maintain by those software repositories or software packages not in the RPM format.

In an embodiment, to certify that the software package manager 120 is compatible with a software package to be updated or installed on the computing system 102, the computing system 102 can include a compatibility tool 126. The compatibility tool 126 can be configured to certify compliance between the software package manager 120 and software packages to be updated or installed on the computing system 102. The compatibility tool 126 can be implemented as an application program that is capable of executing on the computing system 102 to perform the processes as described herein. As such, the compatibility tool 126 can be configured to include the necessary logic, commands, instructions, and protocols in order to perform the methods and processes described herein. Likewise, the compatibility tool 126 can be implemented as a portion of another application program, such as the software package manager 120 or manager tools 122. In either case, the compatibility tool 126 can be stored on computer readable storage devices or media (CD, DVD, hard drive, portable storage memory, etc.) of the computing system 102 and can be executed by the computing system 102.

The compatibility tool 126 can be configured to receive a request, from the user, to certify that the software package manager 120 is compatible with software packages to be updated or installed on the computing system 102. To achieve this, the compatibility tool 126 can be configured to generate command line interfaces and/or GUIs that allow the user to request certification of the software package manager 120 with the software packages and to provide the command line interfaces and/or GUIs to the user via a display of the computing system 102. For example, the compatibility tool 126 can be configured to allow the user to enter an identification (e.g. name, type, version, etc.) of the software package manager 120 installed on the computing system 102. Likewise, for example, the compatibility tool 126 can be configured to allow the user to request that the compatibility tool 126 search the computing system 102 to identify the software package manager 120.

In addition to the identification of the software package manager 120, the compatibility tool 126 can be configured to receive, in the request, an identification of the software packages to be certified as compatible with the software package manager 120. The compatibility tool 126 can be configured to generate and provide the command line interfaces and/or GUIs that allow the user to specify an identification (e.g.

name, format etc.) of software packages to be certified as compatible with the software package manager 120. Likewise, the compatibility tool 126 can be configured to generate and provide the command line interfaces and/or GUIs to allow the user to request that the compatibility tool 126 search for software packages installed on the computing system 102 and certify the installed software packages as compatible with the software package manager 120.

Once the software package manager 120 and the software packages have been identified, the compatibility tool 126 can be configured to determine if the software package manager 120 is compatible with the identified software packages to be updated or installed. To achieve this, the compatibility tool 126 can be configured to maintain a compatibility database 128. The compatibility database 128 can be configured to maintain a record identifying different software package managers and identifying the software packages that are compatible with the different software package managers. The compatibility database 128 can be configured to maintain other information related to the software package managers such as location to acquire the software package managers, software repositories that support the software package managers, and the like. The compatibility database 128 can be configured according to any type of open-source or proprietary database format.

Figure 2A:
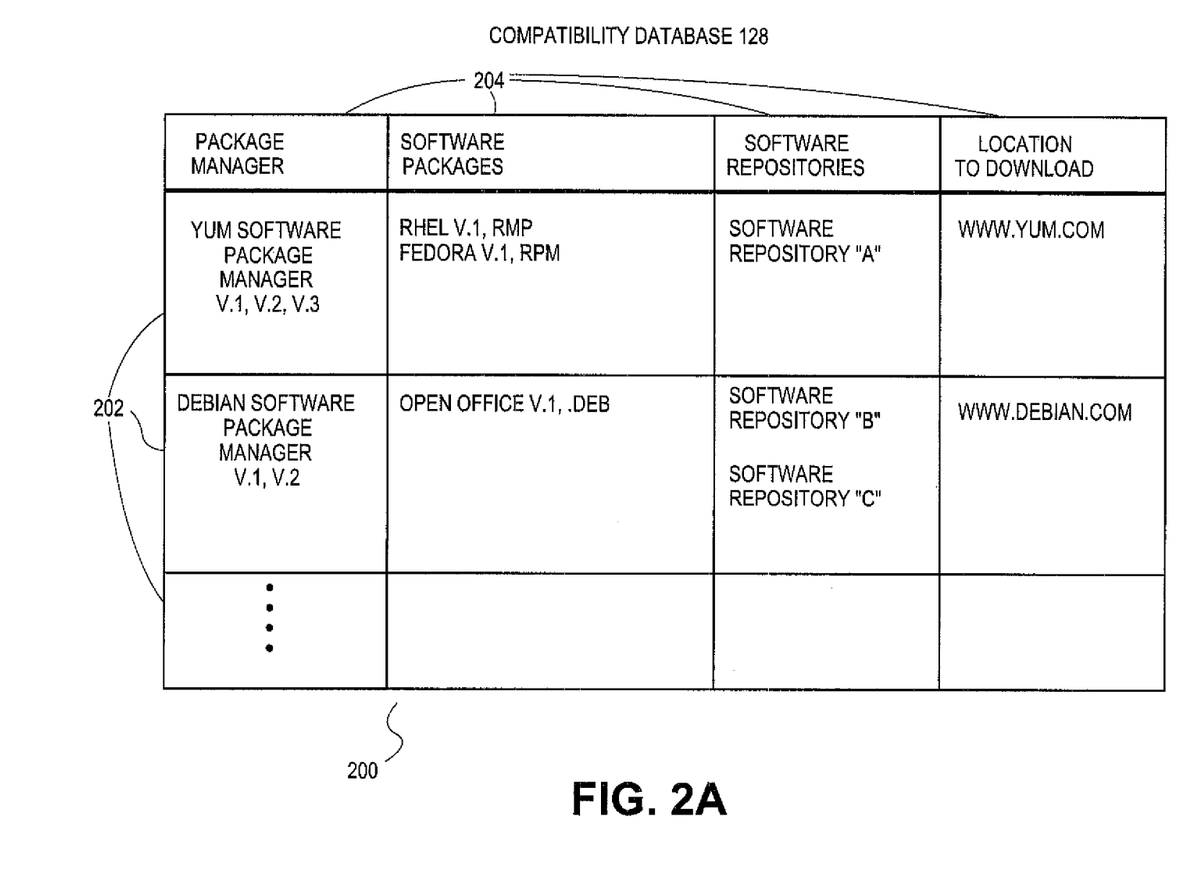
FIG. 2A illustrates an example of a compatibility database, according to various embodiments.

FIG. 2A illustrates an example of the compatibility database 128. As illustrated, the compatibility database 128 can include a table 200. The table 200 can include rows 202 that store information related to each known software package manager. Additionally, each row 202 can include a series of columns 204. Each column 204 corresponding to a particular row 202 can include an identification of a known software package manager (name, type, versions, etc.), the software packages that are compatible with the software package manager, identification of software repositories that are compatible with the software package manager, and location to obtain the software package manager. One skilled in the art will realize that the compatibility database can include additional information related to known software package managers.

To determine the compatibility of the software package manager 120 with the identified software packages, the compatibility tool 126 can be configured to search the compatibility database 128 for an entry matching the software package manager 120 and extract the software packages that are compatible with the software package manager 120. To achieve this, the compatibility tool 126 can be configured to include the necessary logic, commands, instructions, and protocols to communicate with the compatibility database 128, search the compatibility database 128, and extract information from the compatibility database 128. Once extracted, the compatibility tool 126 can be configured to compare the extracted software packages to the identified software packages to be updated or installed on the computing system 102. To achieve this, the compatibility tool 126 can be configured to include the necessary logic, commands, instructions, and protocols to compare the extracted software packages to the identified software packages, for example, textual comparison of the names, format, etc.

Once the compatibility is determined, the compatibility tool 126 can be configured to notify the user of the compatibility determination. The compatibility tool 126 can be configured to generate and provide the notification in the command line interfaces or GUIs used in the request. The notification can include any information that notifies the user of whether the software package manager 120 is compatible with the identified software packages to be updated or installed on the computing system 102. The notification can include other information such as the software repositories that are compatible with the software package manager 120 and, if the software package manager 120 is not compatible, an identification of the compatible software package manger and a location to acquire the compatible software package manager.

Figure 2B:
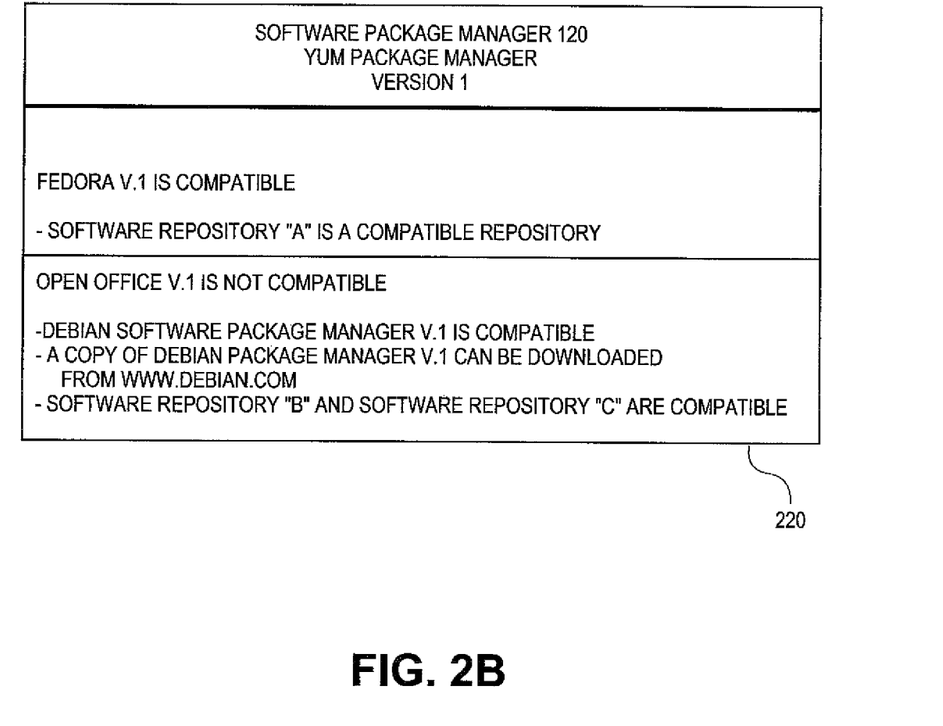
FIG. 2B illustrates an example of a notification, according to various embodiments.

FIG. 2B illustrates an example of a notification 220 provided to the user. In this example, the software package manager 120 can be the Yum software package manager, version 1, and the identified software packages to be updated or installed can be "Fedora, v. 1", and "Open Office, v. 1". As illustrated, the notification 220 can include an indication of whether the software package manager 120 is compatible with the identified software packages and an indication of compatible software repositories. Additionally, because the software package manager 120 is not compatible with "Open Office, v. 1", the notification 220 can include an identification of a compatible software package manager, compatible software repositories, and a location to acquire the compatible software package manager.

As described above, the compatibility tool 126 can certify the compatibility of a software package manager used by or known to the user of the computing system 102. In another embodiment, the compatibility tool 126 can be configured to provide an identification of a software package manager that is compatible with software packages to be updated or installed. For example, the software package manager 120 may not be installed on the computing system 102, and the user may desire to install or update a software package but does not know of the name or type of a software package manager.

In this embodiment, the compatibility tool 126 can be configured to receive a request from the user to identify a software package manager that is compatible with software packages to be updated or installed on the computing system 102. As described above, the compatibility tool 126 can be configured to generate and provide command line interfaces or GUIs that allow the user to request identification of a compatible software package manager. The compatibility tool 126 can be configured to provide the command line interfaces or GUIs that allow the user to identify the name and/or type of software packages and request an identification of software package managers that are compatible with the identified software packages. Likewise, the compatibility tool 126 can be configured to provide the command line interfaces or GUIs to allow the user to request that the compatibility tool 126 identify software packages installed on the computing system 102 and request an identification of software package managers that are compatible with the identified software packages installed on the computing system 102.

Once the request is receive, the compatibility tool 126 can be configured to determine software package managers that are compatible with the identified software packages. To achieve this, the compatibility tool 126 can be configured to search the compatibility database 128 for an entry corresponding to the name and/or type of identified software packages and extract an identification of the software package managers that are compatible with the requested software packages.

Once the an identification of compatible software package managers is extracted, the compatibility tool 126 can be configured to notify the user of the identification of the compatible software package managers. The compatibility tool 126 can be configured to generate and provide the notification in the command line interfaces or GUIs used in the request. The notification can include any information that identifies the compatible software package managers. The notification can include other information such as the software repositories that are compatible with the software package managers and a location to acquire the software package managers.

Figure 2C:
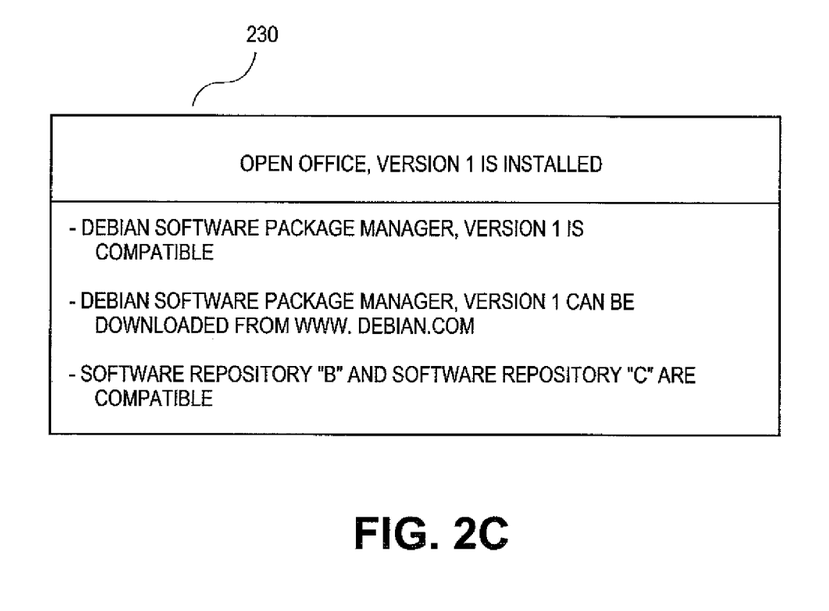
FIG. 2C illustrates another example of a notification, according to various embodiments.

FIG. 2C illustrates an example of a notification 230 of compatible software package managers. In this example, the compatibility tool 126 can identify the software packages to be updated or installed as "Open Office, v. 1". As illustrated, the notification 230 can include an identification of a compatible software package manager, compatible software repositories, and a location to acquire the compatible software package manager.

Figure 1B:
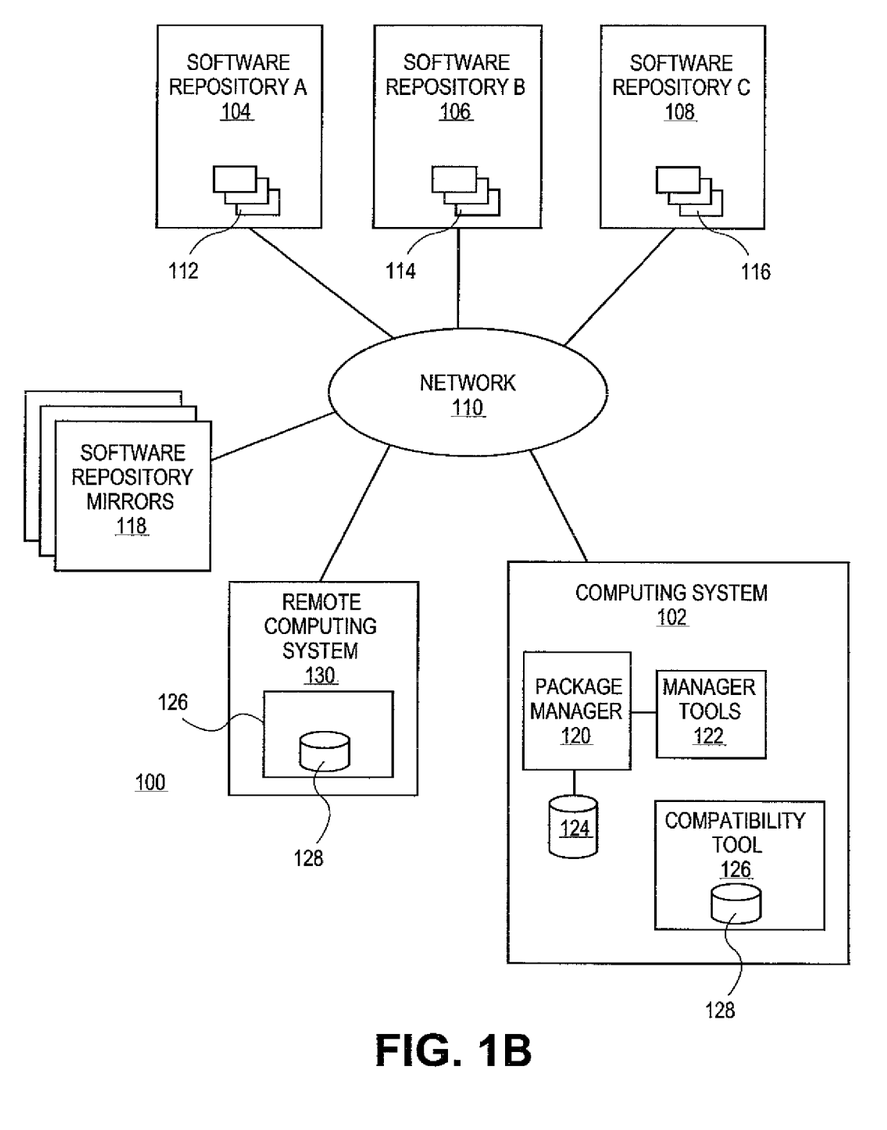

As described above, the compatibility tool 126 can be stored and executed on the computing system 102 so that the user can locally certify and/or identify compatible software package managers. FIG. 1B illustrates another example of the software package delivery system 100 in which the compatibility tool 126 can be stored and executed on remote computing systems and can be remotely accessed by the computing system 102, according to various embodiments of the present teachings. While FIG. 1B illustrates various components that can be included in the software package delivery system 100, one skilled in the art will realize that additional components can be added or existing components can be removed.

As illustrated in FIG. 1B, the compatibility tool 126 can be stored and executed on a remote computing system, such as a remote computing system 130 or the software repository "A" 104. The remote computing system 130 can be any type of conventional computing system or other devices, such as such as servers, personal computers, laptop computers, network-enabled media devices, networked stations, etc., under the control of any type of entity. For example, the remote computing system 130 can be under the control of a software package manager vendor, and the vendor can utilize the compatibility tool 126 to notify users of the compatibility of its software package manager.

In this embodiment, the compatibility tool 126 can be configured to allow the user to request, via the one or more networks 110, remote use of the compatibility tool 126. The compatibility tool 126 can be configured to allow the user to request that the compatibility tool 126 certify compatibility of a software package manager 120 installed on the computing system 102 or known to the user. Likewise, the compatibility tool 126 can be configured to allow the user to request that the compatibility tool 126 identify compatible software package managers. To achieve this, the compatibility tool 126 can be configured to include the necessary logic, commands, instructions, and protocols to generate command line interfaces and/or GUIs that are accessible via the one or more networks 110. For example, the compatibility tool 126 can generate an interface in a format, such as Hypertext Markup Language (HTML), that is accessible, via the network 110, using an application program, such as web browser, executing on the computing system 102.

When the request is received via the one or more networks 110, the compatibility tool 126 can certify compatibility or provide an identification of a compatible software package manager as described above in FIG. 1A. Likewise, the compatibility tool 126 can be configured to notify the user, via the one or more networks 110, of the certification of compatibility or the identification of the compatible software package manager. The compatibility tool 126 can be configured to provide the notification in the command line interfaces and/or GUIs that are accessible via the one or more networks 110.

Figure 3:
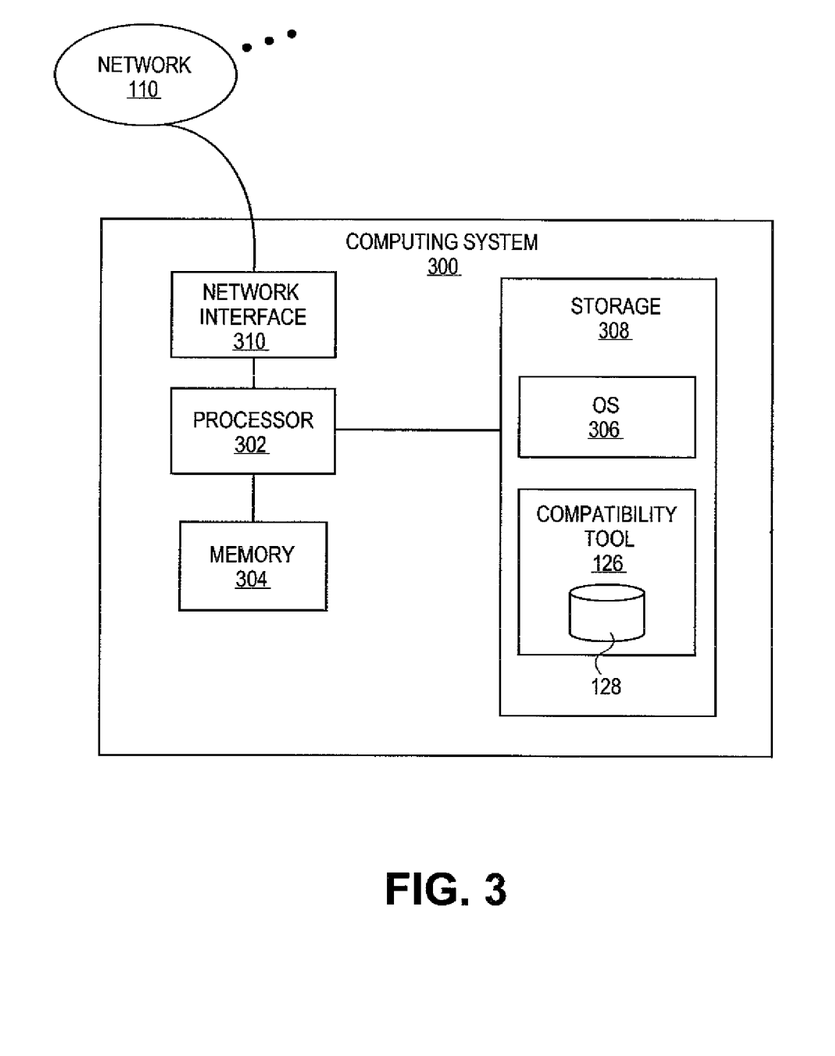
FIG. 3 illustrates an exemplary hardware configuration for a computing system capable of executing the compatibility tool, according to various embodiments.

FIG. 3 illustrates an exemplary diagram of hardware and other resources that can be incorporated in a computing system 300, such as the computing system 102, the software repository "A" 104, the software repository "B" 106, the software repository "C" 108, or the remote computing system 130, and configured to store and execute the compatibility tool 126, according to embodiments. In embodiments as shown, the computing system 300 can comprise a processor 302 communicating with a memory 304, such as electronic random access memory, operating under control of or in conjunction with a operating system (OS) 306. The OS 306 can be, for example, a distribution of the Linux™ operating system, such as Red Hat™ Enterprise Linux, Fedora, etc., the Unix™ operating system, or other open-source or proprietary operating system or platform. The processor 302 also communicates with one or more computer readable storage devices or media 308, such as hard drives, optical storage, and the like, for maintaining the OS 306 and the compatibility tool 126. The processor 302 further communicates with network interface 310, such as an Ethernet or wireless data connection, which in turn communicates with one or more networks 110, such as the Internet or other public or private networks.

The processor 302 also communicates with the compatibility tool 126 to execute the logic of the compatibility tool 126 and to allow performance of the processes as described herein. Other configurations of the computing system 300, associated network connections, and other hardware and software resources are possible.

While FIG. 3 illustrates the computing system 300 as a standalone system including a combination of hardware and software, the computing system 300 can include multiple systems operating in cooperation. As described above, the compatibility tool 126 can be implemented as an application program capable of being executed by the computing system 300, as illustrated, or other conventional computer platforms. Likewise, the compatibility tool 126 can also be implemented as a software module or program module capable of being incorporated in other software applications and programs, such as the OS 306 of the computing system 300, the software package manager 110, the manager tools 122, and/or combined in a single application or program. In any example, the compatibility tool 126 can be implemented in any type of conventional proprietary or open-source computer language. When implemented as a application program, application module, or program code, the compatibility tool 126 can be stored in a computer readable storage medium, such as the storage 308, accessible by the computing system 300. Likewise, during execution, a copy of the compatibility tool 126 can be stored in the memory 304.

Figure 4A:
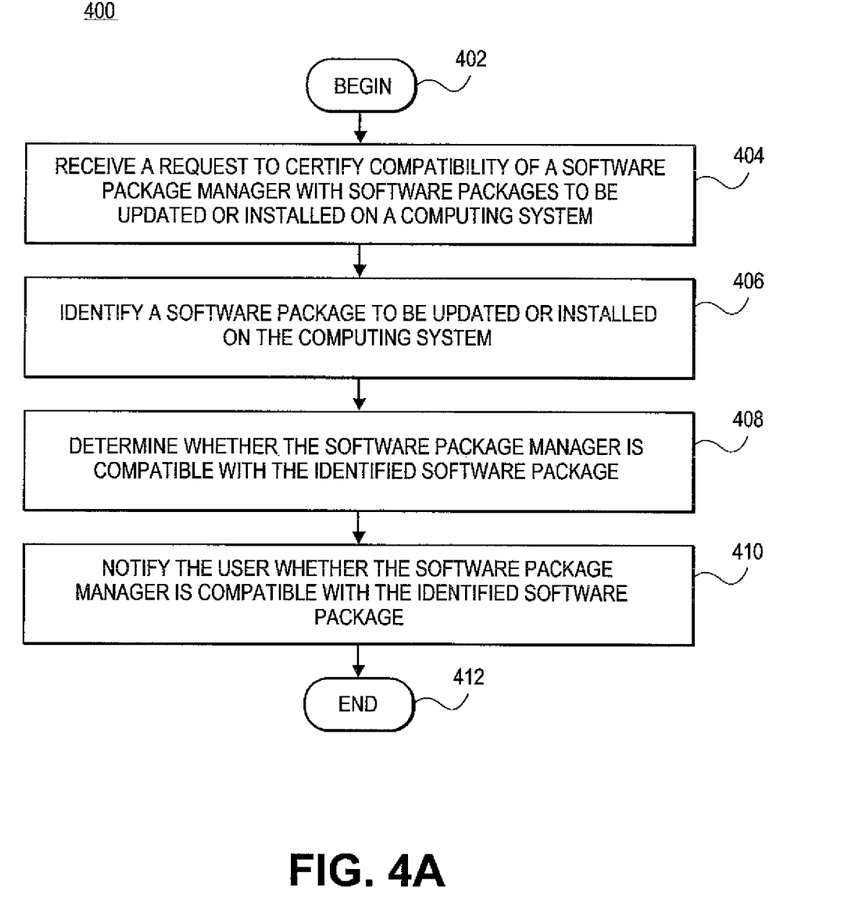
FIG. 4A illustrates a flowchart of an exemplary process for certifying the compatibility of a software package manager with software packages to be updated or installed, according to various embodiments.

FIG. 4A illustrates a flow diagram for a process 400 of certifying compatibility of a package manager with software packages to be updated or installed, according to embodiments of the present teachings. In 402, the process can begin. In 404, the compatibility tool 126 can receive a request to certify compatibility of a software package manager with software packages to be updated or installed on the computing system 102. The request can be received, locally, by the compatibility tool 126 if the compatibility tool 126 resides at the computing system 102. Likewise, the request can be received, remotely, by the compatibility tool 126 if the compatibility tool resides at a remote computing system.

For example, the request can include an identification of the software package manager being certified. Likewise, the request can direct the compatibility tool 126 to search the computing system 102 to identify the software package managers installed on the computing system 102.

In 406, the compatibility tool 126 can identify the software packages to be updated or installed on the computing system 102. For example, the user can identify the software packages in the request. Likewise, the user can request that the compatibility tool 126 search the computing system 102 and identify software packages installed on the computing system 102.

In 408, the compatibility tool 126 can determine whether the software package manager is compatible with the identified software packages. The compatibility tool 126 can search the compatibility database 128 for an entry matching the software package manager and extract the software packages that are compatible with the software package manager. Once extracted, the compatibility tool 126 can compare the extracted software packages to the identified software packages to be updated or installed on the computing system 102 to determine if the software package manager is compatible.

In 410, the compatibility tool 126 can notify the user whether the software package manager is compatible with the identified software packages. For example, the notification can include any information that notifies the user of whether the software package manager is compatible with the identified software packages to be updated or installed on the computing system 102. Additionally, the notification can include other information such as the software repositories that are compatible with the software package manager and, if the software package manager is not compatible, an identification of the compatible software package manger and a location to acquire the compatible software package manager.

In 412, the process can end, but the process can return to any point and repeat.

Figure 4B:
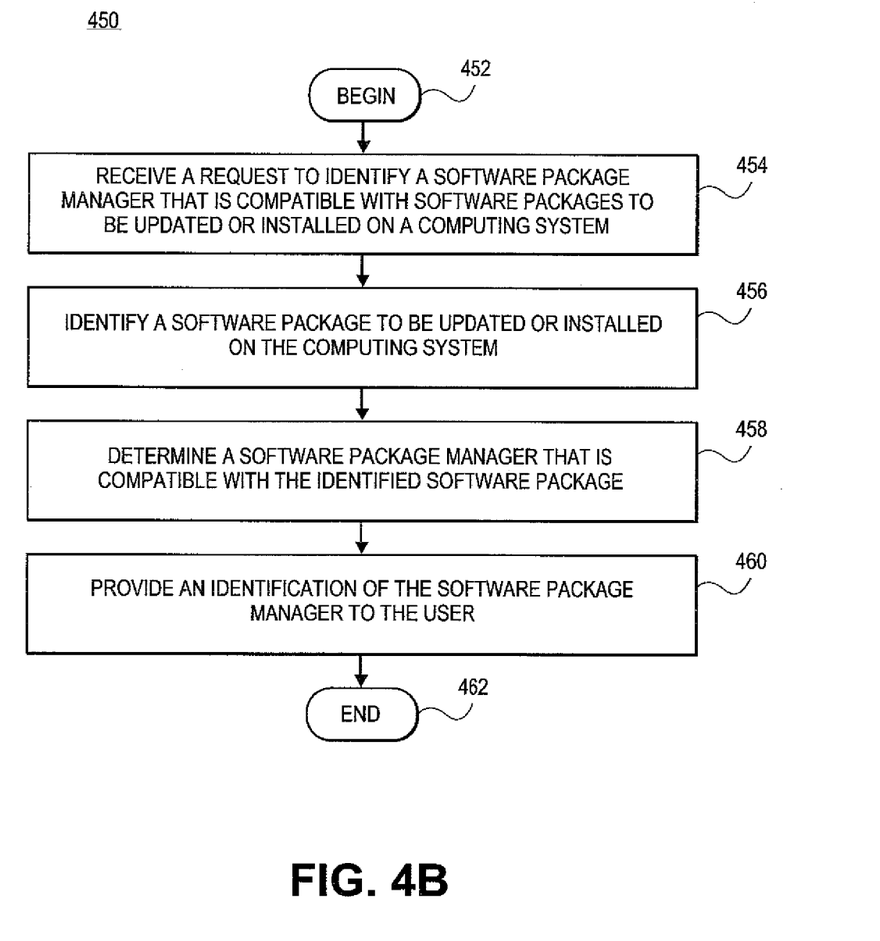
FIG. 4B illustrates a flowchart of an exemplary process for identifying a software package manager that is compatible with software packages to be updated or installed, according to various embodiments.

FIG. 4B illustrates a flow diagram for a process 450 of identifying software package managers that are compatible with software packages to be updated or installed, according to embodiments of the present teachings. In 452, the process can begin. In 454, the compatibility tool 126 can receive a request to identify a software package manager that is compatible with software packages to be updated or installed on a computing system 102. The request can be received, locally, by the compatibility tool 126 if the compatibility tool 126 resides at the computing system 102. Likewise, the request can be received, remotely, by the compatibility tool 126 if the compatibility tool resides at a remote computing system.

In 456, the compatibility tool 126 can identify a software package to be updated or installed on the computing system 102. For example, the user can identify the software packages in the request. Likewise, the user can request that the compatibility tool 126 search the computing system 102 and identify software packages installed on the computing system 102.

In 458, the compatibility tool 126 can determine a software package manager that is compatible with the identified software package. The compatibility tool 126 can search the compatibility database 128 for an entry corresponding to the name and/or type of identified software package and extract an identification of the software package managers that are compatible with the requested software package.

In 460, the compatibility tool 126 can provide an identification of the software managers to the user. For example, the compatibility tool 126 can provide a notification that can include any information that identifies the compatible software package managers. The notification can include other information such as the software repositories that are compatible with the software package managers and a location to acquire the software package managers.

In 462, the process can end, but the process can return to any point and repeat.

Certain embodiments can be performed as a computer application program. The application program can exist in a variety of forms both active and inactive. For example, the application program can exist as software program(s) comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software of the computer application program on a CD-ROM or via Internet download. In a sense, the Internet itself, as an abstract entity, is a computer readable medium. The same is true of computer networks in general.

While the teachings have been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method comprising:
receiving a request to certify compatibility of a first software package manager with a software package to be installed on a computing system;
certifying, by a processor, that the first software package manager is not compatible with the software package in view of the request by executing at least one of logic, commands, instructions or protocols to facilitate:
    accessing a compatibility database in which software packages are mapped to software repositories and corresponding compatible software package managers; and
    determining that a format of the software package is not compatible with one or more formats of a first software repository to which the first software package manager corresponds, wherein the first software repository is available over a network;
identifying, by the processor, a second software package manager that is compatible with the software package when the first software package manager is certified as not compatible with the software package, wherein identifying comprises:

extracting, from the compatibility database, a plurality of software packages associated with the second software manager;
comparing names and formats of the plurality of software packages, after extraction, with those of the software package; and
verifying the software package matches one of the plurality of software packages; and
sending, to the computing system, a notification indicating that the second software package manager is compatible with the software package and identifying a second software repository from which to download the second software manager.

2. The method of claim 1, the method further comprising:
receiving a request, through a user interface, to certify compatibility of the first software package manager with the software update package; and
receiving, through the user interface, an identification of the first software package manager.

3. The method of claim 1, further comprising identifying the software package by receiving an identification of the software package through a user interface.

4. The method of claim 1, further comprising determining whether the second software package manager is compatible with the software package by searching a database to identify software packages that are compatible with the second software package manager.

5. The method of claim 1, the method further comprising:
providing a location of the second software repository from which to retrieve the second software package manager.

6. The method of claim 5, the method further comprising:
providing the second software package manager through a user interface.

7. A computer readable storage medium comprising instructions for causing the processor to perform the method of claim 1.

8. A method comprising:
identifying, by a processor, a plurality of software package managers located on different software repositories that are compatible with a software package to be installed on a computing system;
receiving a request to certify compatibility of a first software package manager with the software package;
certifying, by the processor, that the first software package manager is not compatible with the software package in view of the request by executing at least one of logic, commands, instructions or protocols to facilitate:
accessing a compatibility database in which software packages are mapped to software repositories and corresponding compatible software package managers; and
determining that a format of the software package is not compatible with one or more formats of a first software repository to which the first software package manager corresponds, wherein the first software repository is available over a network;
identifying, by the processor, a second software package manager that is compatible with the software package when the first software package manager is certified as not compatible with the software package, wherein identifying comprises:
extracting, from the compatibility database, a plurality of software packages associated with the second software manager;
comparing names and formats of the plurality of software packages, after extraction, with those of the software package; and
verifying the software package matches one of the plurality of software packages; and
sending, to the computing system, a notification indicating that the second software package manager is compatible with the software package and identifying a second software repository from which to download the second software manager.

9. The method of claim 8, further comprising identifying the software package by receiving an identification of the software package through a user interface.

10. The method of claim 8, wherein identifying the software package comprises: searching a computer readable storage medium of the computing system to identify the software package.

11. The method of claim 8, the method further comprising:
receiving a request, through a user interface, to certify compatibility of the software package manager with the software package; and
providing, through the user interface, a location of the second software repository from which to retrieve the second software package manager.

12. The method of claim 8, the method further comprising providing the second software package manager through a user interface.

13. A computer readable storage medium comprising instructions for causing the processor to perform the method of claim 8.

14. A system comprising:
a network interface; and
a processor operatively coupled to communicate with the network interface, the processor to execute at least one of logic, commands, instructions or protocols to:
receive a request to certify compatibility of a first software package manager with a software package to be installed on a computing device,
certify that the first software package manager is not compatible with the software package in view of the request by:
accessing a compatibility database in which software packages are mapped to software repositories and corresponding compatible software package managers; and
determining that a format of the software package is not compatible with one or more formats of a first software repository to which the first software package manager corresponds, wherein the first software repository is available over a network,
identify a second software package manager that is compatible with the software package when the first software package manager is certified as not compatible with the software package, wherein to identify comprises to:
extract, from the compatibility database, a plurality of software packages associated with the second software manager;
compare names and formats of the plurality of software packages, after extraction, with those of the software package; and
verify the software package matches one of the plurality of software packages, and
send, to the computing device, a notification indicating that the second software package manager is compatible with the software package and identifying a second software repository from which to download the second software manager.

15. The system of claim 14, the system further comprising a storage device in which to store the compatibility database, and the processor further to search the compatibility database to identify software packages that are compatible with the second software package manager.

16. A computing system comprising:
a network interface; and
a processor operatively coupled to communicate with the network interface, the processor to execute at least one of logic, commands, instructions or protocols to:
- identify a plurality of software package managers located on different software repositories that are compatible with a software package to be installed on a computing system,
- receive a request to certify compatibility of a first software package manager with the software package,
- certify that the first software package manager is not compatible with the software package in view of the request by:
  - accessing a compatibility database in which software packages are mapped to software repositories and corresponding compatible software package managers; and
  - determine that a format of the software package is not compatible with one or more formats of a first software repository to which the first software package manager corresponds, wherein the first software repository is available over a network;
- identify a second software package manager that is compatible with the software package when the first software package manager is certified as not compatible with the software package, wherein to identify comprises to:
  - extract, from the compatibility database, a plurality of software packages associated with the second software manager;
  - compare names and formats of the plurality of software packages, after extraction, with those of the software package; and
  - verify the software package matches one of the plurality of software packages; and
- send, to the computing system, a notification indicating that the second software package manager is compatible with the software package and identifying a second software repository from which to download the second software manager.

17. The computing system of claim 16, wherein the processor is further to:
- receive a request, through a user interface, to identify software package managers that are compatible with the software package, and
- search, via the network interface, a computer readable storage medium of the computing system to identify the software package.

18. The computing system of claim 16, further comprising a storage device in which to store the compatibility database, and the processor further to search the compatibility database to determine the second software package manager that is compatible with the software package.

* * * * *